United States Patent
Vadder

(10) Patent No.: US 10,780,632 B2
(45) Date of Patent: Sep. 22, 2020

(54) ADDITIVE MANUFACTURED HEADER FOR HEAT EXCHANGERS

(71) Applicant: Evapco, Inc., Taneytown, MD (US)

(72) Inventor: Davey Vadder, Westminster, MD (US)

(73) Assignee: Evapco, Inc., Taneytown, MD (US)

( * ) Notice: Subject to any disclaimer, the term of this patent is extended or adjusted under 35 U.S.C. 154(b) by 34 days.

(21) Appl. No.: 16/022,265

(22) Filed: Jun. 28, 2018

(65) Prior Publication Data

US 2019/0134894 A1 May 9, 2019

Related U.S. Application Data

(60) Provisional application No. 62/525,995, filed on Jun. 28, 2017.

(51) Int. Cl.
*B22F 3/00* (2006.01)
*B22F 3/105* (2006.01)
*B22F 3/24* (2006.01)
*B22F 5/10* (2006.01)
*B23P 15/26* (2006.01)
*B28B 1/00* (2006.01)
*B28B 11/12* (2006.01)
*B29C 64/165* (2017.01)
(Continued)

(52) U.S. Cl.
CPC ............ *B29C 64/165* (2017.08); *B22F 3/008* (2013.01); *B22F 3/1055* (2013.01); *B22F 3/24* (2013.01); *B22F 5/106* (2013.01); *B23P 15/26* (2013.01); *B28B 1/001* (2013.01); *B28B 11/12* (2013.01); *B29C 69/001* (2013.01); *B33Y 10/00* (2014.12); *B33Y 80/00* (2014.12); *F28D 1/05366* (2013.01); *F28F 1/10* (2013.01); *F28F 9/02* (2013.01); *F28F 21/04* (2013.01); *F28F 21/062* (2013.01); *F28F 21/081* (2013.01); *B22F 2003/247* (2013.01); *B22F 2998/10* (2013.01); *B29L 2031/18* (2013.01); *F28F 2255/18* (2013.01)

(58) Field of Classification Search
CPC .......... B22F 3/008; B22F 3/1005; B22F 3/24; B22F 5/106; B22F 2003/247; B22F 2998/10; B23P 15/26; B28B 1/001; B28B 11/12; B29C 64/165; B29C 69/001; B29L 2031/18; B33Y 10/00; B33Y 80/00; F28D 1/05366; F28F 1/10; F28F 9/02; F28F 21/04; F28F 21/062; F28F 21/081; F28F 2255/18

See application file for complete search history.

(56) References Cited

U.S. PATENT DOCUMENTS 2,919,903 A 1/1960 Vautrain et al.
6,501,663 B1 * 12/2002 Pan .................. H01L 21/288
174/260

(Continued)

FOREIGN PATENT DOCUMENTS

WO WO-2018154277 A1 * 8/2018 ........... B29C 64/336

OTHER PUBLICATIONS

International Search Report dated Oct. 2, 2018 in copending application No. PCT/US2018/040092.

*Primary Examiner* — Jacob J Cigna
(74) *Attorney, Agent, or Firm* — Whiteford, Taylor & Preston, LLP; Peter J. Davis

(57) ABSTRACT

A stacked tube heat exchanger consisting of tubes that are affixed to a header or headers that are additively manufactured.

4 Claims, 4 Drawing Sheets

Step 3 - Formation of Header between Tubes

Step 4- Top End Plate

(51) Int. Cl.

| | |
|---|---|
| B29C 69/00 | (2006.01) |
| B29L 31/18 | (2006.01) |
| B33Y 10/00 | (2015.01) |
| B33Y 80/00 | (2015.01) |
| F28D 1/053 | (2006.01) |
| F28F 1/10 | (2006.01) |
| F28F 21/04 | (2006.01) |
| F28F 21/06 | (2006.01) |
| F28F 21/08 | (2006.01) |
| F28F 9/02 | (2006.01) |

(56) References Cited

U.S. PATENT DOCUMENTS

| | | | | |
|---|---|---|---|---|
| 9,200,855 | B2* | 12/2015 | Kington | F02C 7/10 |
| 9,563,984 | B2* | 2/2017 | Willis | G06T 19/20 |
| 2004/0141043 | A1* | 7/2004 | Silverbrook | B22F 3/008 |
| | | | | 347/105 |
| 2008/0149313 | A1 | 6/2008 | Slaughter | |
| 2009/0211743 | A1* | 8/2009 | Schrader | F28D 1/0426 |
| | | | | 165/173 |
| 2012/0211158 | A1* | 8/2012 | Becnel | B21D 53/02 |
| | | | | 156/293 |
| 2013/0171019 | A1* | 7/2013 | Gessler | B29D 28/00 |
| | | | | 419/2 |
| 2014/0360698 | A1* | 12/2014 | Waldman | B22F 3/1055 |
| | | | | 165/81 |
| 2016/0020501 | A1* | 1/2016 | Lindsey | H01P 5/085 |
| | | | | 333/24 R |
| 2016/0231068 | A1 | 8/2016 | Schmitz et al. | |
| 2016/0265850 | A1* | 9/2016 | Kupiszewski | F28D 1/0233 |
| 2016/0311020 | A1* | 10/2016 | Abeshaus | B22F 3/1055 |
| 2017/0205145 | A1* | 7/2017 | Manteiga | B22F 3/1055 |
| 2018/0050486 | A1* | 2/2018 | Talgorn | B29C 70/70 |
| 2019/0011187 | A1* | 1/2019 | Bucknell | B23P 15/26 |

* cited by examiner

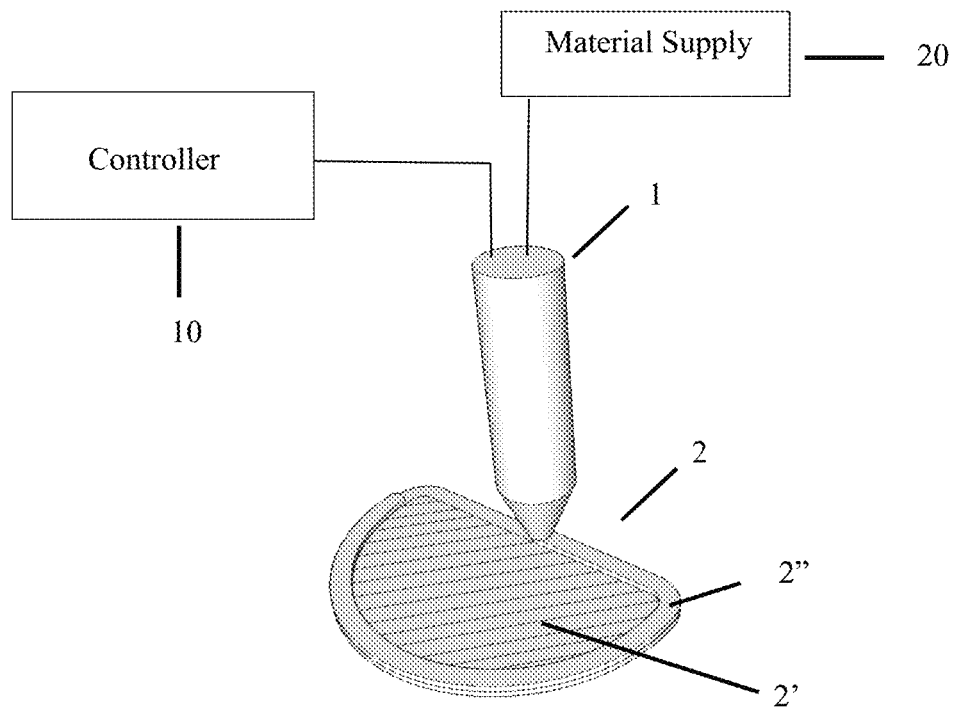
Figure 1- Step 1-Header End Plate Formation
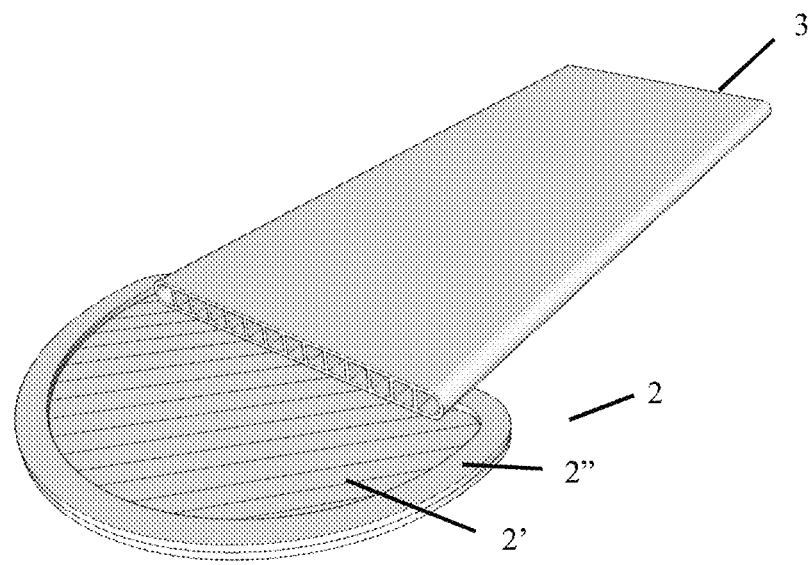
Figure 2 – Step 2-Tube Placement on End Plate

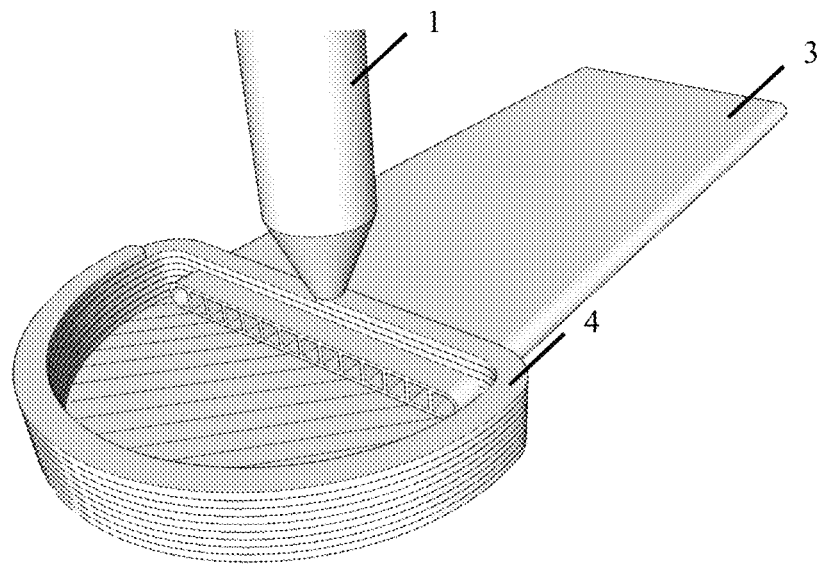
Figure 3 – Step 3 - Formation of Header between Tubes
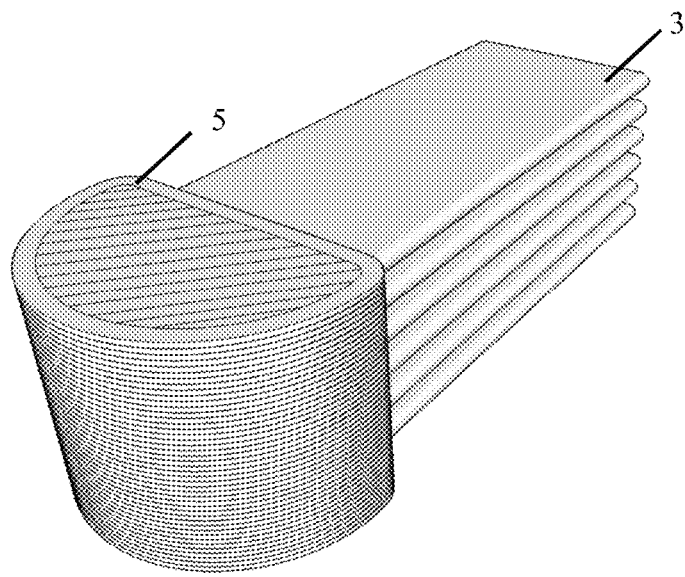
Figure 4 – Step 4- Top End Plate

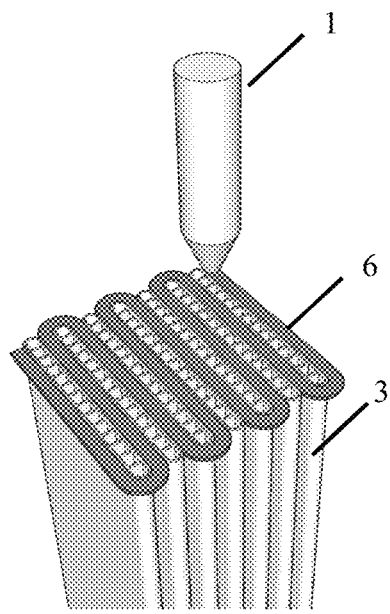
Figure 5 – Step 1/Method 2 – Header Plate Start
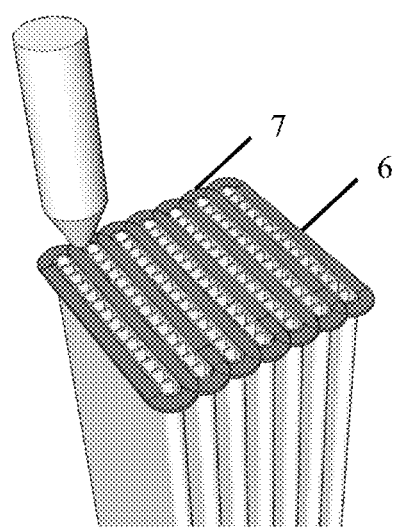
Figure 6 – Step 2/Method 2 – Header Plate Complete

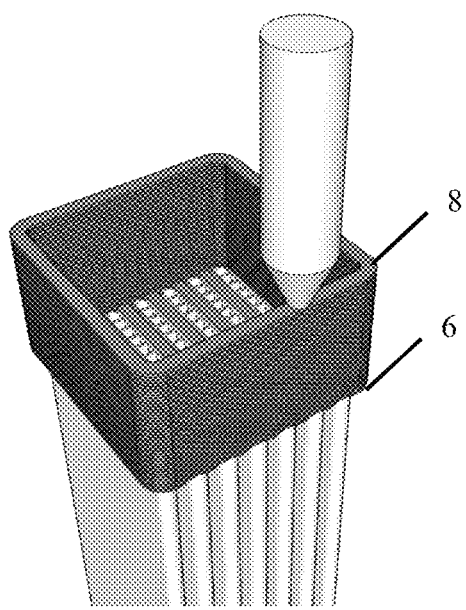
Figure 7 – Step 3/Method 2 Header Wall
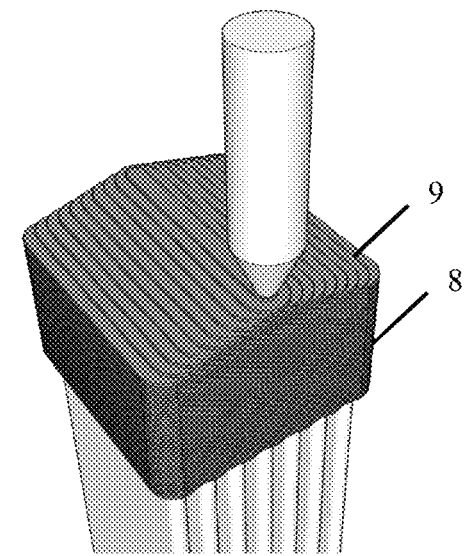
Figure 8 – Step 4/Method 2 Header Cap

ADDITIVE MANUFACTURED HEADER FOR HEAT EXCHANGERS

BACKGROUND OF THE INVENTION

Field of the Invention

This invention relates to methods of manufacture for stacked element heat exchangers.

Description of the Background

Tube headers are quite possibly the most labor intensive part of a heat exchanger to manufacture. Current manufacturing methods also do not lend themselves to the ability to produce a leak-free joint.

It is well known and common practice to manufacture a heat exchanger header by stacking plates. The joints comprising these designs are usually performed by welding or brazing, which can be very labor intensive and/or leak prone. Traditional fastening techniques, such as brazing or welding, also limit the material types used to metals with nearly the same melting point.

SUMMARY OF THE INVENTION

The present invention is directed to the manufacture of a stacked element heat exchanger, for example, a tube bundle. Heat exchanger stacked element tube bundles are typically comprised of a collection of flattened tubes, attached at each end to a header. The headers, usually in the shape of a large round tube or an elongated box, serve to support and separate the tubes from one-another (for the passage of air there-between) and to deliver or receive fluid, for example steam or refrigerant, to the tubes. The tube bundle may have fins fitted between and attached to the tubes, or the tubes may be finless. According to the prior art, the tubes and the header were made of the same material, usually steel, and slots were cut into the header to receive the tubes which were then welded into the slots. The present invention allows the header to be built onto the coil using a myriad of different materials and with the speed of additive manufacturing. Tubes are stacked one-after-another as the header is built up from one end to the other. Headers are formed in place, layer-by-layer using additive manufacturing. This invention seeks to expand the use of stacked type heat exchangers into multi-material and polymeric materials.

According to an embodiment of the invention, a header is affixed to the tube by being additively manufactured in-situ. Leak free joints are sealed effectively by essentially pouring the header around the ends of the tubes as they are stacked upon one-another. Alternately, parts of the header can be pre-formed and laminated in place to speed up the process. Additionally, the invention allows for the use of multiple materials simultaneously, in which tubes and headers may be made of the same or different materials, creating a composite header and tube bundle that is strong and leak proof.

According to another embodiment, headers may be additively manufactured at both ends of the tubes simultaneously so that the assembly of the entire tube bundle is completed at the same time.

According to a further embodiment, a header may be printed on a tube bundle that is already stacked. This embodiment may be preferred in instances where metallic tubes and metallic fins have been fastened to each other in a furnace braze process such that the tubes cannot be stacked during the header production process.

Accordingly, there is presented according to the invention, a heat exchanger coil header having tubes that are affixed into a header envelope, wherein the header envelope is produced in-situ by additive manufacturing as the tubes are stacked in the heat exchanger. There is further provided according to the invention, a device having a thermoplastic header and tube material. According to an alternate embodiment, the device may have a metallic header and tube material. According to a further alternate embodiment, the device may have ceramic header and tube material. According to still further embodiments, the header layers may be made from a different material than the tubes.

According to further various embodiments of the device, there may be fins between the tubes and/or the tubes may be sealed tubes that are heat pipes.

According to various different embodiments, the deposited material may be solid during deposition, liquid during deposition and/or some combination thereof.

According to another embodiment of the invention, there is provided a method for manufacturing a heat exchanger coil, comprising: the following steps:
  a. using an additive manufacturing depositor to lay down header material in the form of a first header end-cap;
  b. positioning a first heat exchange tube on said first header end cap;
  c. using said additive manufacturing depositor to lay down said header material up to and over said first heat exchange tube to encapsulate an end thereof in an interior of said header and to form a first header spacing section between said first heat exchange tube and a second heat exchange tube;
  d. positioning a second heat exchange tube on said first header spacing section;
  e. repeating steps c and d until a desired header size is reached;
  f. using said additive manufacturing depositor to lay down header material in the form of a second header end-cap.

Inlets and outlets to the header may be added during any one or more of steps a, c and f. Alternatively, inlets and outlets may be formed by drilling holes in the header for the passage of fluid into and out of said header.

According to further embodiments of the invention, the method for manufacturing the heat exchanger coil may include the following additional steps:
  g. using a second additive manufacturing depositor to lay down header material in the form of a third header end-cap at an opposite end of said heat exchanger coil simultaneously with the formation of said first header end-cap;
  h. wherein said positioning a first heat exchange tube on said first header end cap step also positions said first heat exchange tube on said third header end-cap at an opposite end of said first heat exchange tube from said first header end cap;
  i. using said second additive manufacturing depositor to lay down header material up to and over said first heat exchange tube to encapsulate an end thereof in an interior of said header and to form a second header spacing section between said first heat exchange tube and a second heat exchange tube at said opposite end of said first heat exchange tube;
  j. wherein said positioning a second heat exchange tube on said first header spacing section step also positions said second heat exchange tube on said second header spacing section.
  k. repeating steps i and j until a desired header size is reached;

l. using said second additive manufacturing depositor to lay down header material in the form of a fourth header end-cap at said opposite end of said heat exchanger coil from said second header end-cap.

According to a further embodiment of the invention, there is provided a method for manufacturing a heat exchanger coil comprising the following steps:
 a. using an additive manufacturing depositor to lay down header material around tube ends and tube-to-tube joints on an end of a pre-formed tube bundle;
 b. using said additive manufacturing depositor to lay down layers of material to build up a header body to a desired height at said end of a pre-formed tube bundle;
 c. using said additive manufacturing depositor to lay down successive overlapping layers of material to form a header end cap.

BRIEF DESCRIPTION OF THE DRAWINGS

The subsequent description of the preferred embodiments of the present invention refers to the attached drawings, wherein:

FIG. 1 shows a step in production of a header and coil bundle according to an embodiment of the invention.

FIG. 2 shows a subsequent step in the production of the header and coil bundle according to the embodiment of the invention shown in FIG. 1.

FIG. 3 shows a further subsequent step in the production of the header and coil bundle according to the embodiment of the invention shown in FIGS. 1 and 2.

FIG. 4 shows a further subsequent step in the production of the header and coil bundle according to the embodiment of the invention shown in FIGS. 1-3.

FIG. 5 shows a step in the production of a header and coil bundle according to another embodiment of the invention.

FIG. 6 shows a subsequent step in the production of a header and coil bundle according to the embodiment shown in FIG. 5.

FIG. 7 shows a further subsequent step in the production of a header and coil bundle according to the embodiments of FIGS. 5 and 6.

FIG. 8 shows a further subsequent step in the production of a header and coil bundle according to the embodiments of FIGS. 5-7.

DETAILED DESCRIPTION

Referring to FIG. 1, in the first step in production of the coil bundle, depositor 1 lays down the end cap 2 of the header. The depositor 1 may lay down metal, plastic, or any other material that is capable of deposit in a predetermined pattern according to an additive manufacturing process. The end cap 2 includes a side face 2' and an edge 2". The side face 2' and the edge 2" of the end cap 2 may be the same or different materials as provided by material supply 20 under control of the controller 10. The sizes, shapes, and materials of the side face 2' and edge2" may be set and/or varied at the controller 10 of the depositor 1.

Once deposit of the side face 2' and the portion of edge 2" required to support tube 3 is completed. Tube 3 is positioned and fixed on end cap 2 of the header (see FIG. 2). Tube 3 may be positioned on the end cap 2 while the depositor 1 is completing the laying down of the edge 2" by depositor 1 in the areas not contacted by the tube 3 or after laying down of edge 2" is completed.

Referring to FIG. 3, once the tube 3 is placed on the header end cap 2, tube 3 is encapsulated by material lain down by the depositor 1 to form a header section 4 between tubes 3. Once the thickness of header section 4 has reached the desired dimension, another tube is placed on top of header section 4, which in turn is followed by deposit of another header section 4, and the placement of another tube. The deposit of inter-tube header sections and the placement of tubes can be repeated as necessary to get the proper size finished tube bundle.

FIG. 4 shows the fourth step in the production of the header. Tubes 3 have already been encapsulated as of step three is repeated as many times as necessary to build the header to full height. End cap 5 is formed to complete the envelope of the header. Inlets and outlets to the header can be formed additively as needed during step 3, or a hole can be drilled to allow fluid to pass in and out.

According to a preferred embodiment, a second depositor may be provided at an opposite end of the tubes so that headers may be additively manufactured at both ends of the tubes simultaneously. In this case, the additive manufacture of both headers is matched/timed to one-another so both headers are ready to receive the same tube at the same time, with the result that the manufacture of both headers, and indeed the assembly of the entire tube bundle (all tubes secured between both headers) is completed at the same time.

According to yet another embodiment, metallic tubes and metallic fins may have been already fastened to one-another, for example in a furnace brace process. In this case, the headers may be printed on the already assembled tube stack, as shown in FIGS. 5-8.

Referring first to FIG. 5, tubes 3 have already been assembled into a coil bundle, minus the headers. Depositor 1 begins forming header plate 6 by depositing material along the boundaries between adjacent tubes. FIG. 6 shows the depositor 1 adding segments 7 to header plate 6 to make a leak-free plate spanning the gaps/joints between all of the tubes in the stack. In a next step, shown in FIG. 7, the depositor makes a plurality of passes around the perimeter of the header plate 6 depositing material in a series of layers in order to build the height of the header body 8. Once the header body has reached the desired height, the depositor is caused to create the header cap 9 by successively adding narrower and narrower overlapping layers until header cap 9 is closed, creating a fully sealed header cap. Inlets and outlets to the header can be formed additively as needed during this step, or holes can be drilled in the completed header to allow for the passage of fluids.

The invention claimed is:
1. A method for manufacturing a heat exchanger coil, comprising:
 1. using an additive manufacturing depositor to lay down header material in the form of a first header end-cap;
 2. positioning a first heat exchange tube on said first header end cap;
 3. using said additive manufacturing depositor to lay down said header material up to and over said first heat exchange tube to encapsulate an end thereof in an interior of said header and to form a first header spacing section between said first heat exchange tube and a second heat exchange tube;
 4. positioning a second heat exchange tube on said first header spacing section;
 5. repeating steps 3 and 4 until a desired header size is reached;
 6. using said additive manufacturing depositor to lay down header material in the form of a second header end-cap.

2. A method for manufacturing a heat exchanger coil according to claim 1, further comprising creating inlets and outlets to said header additively during any one or more of steps 1, 3, and 6.

3. A method for manufacturing a heat exchanger coil according to claim 1, further comprising drilling holes in said header for the passage of fluid into and out of said header.

4. A method for manufacturing a heat exchanger coil according to claim 1, further comprising:
- 7. using a second additive manufacturing depositor to lay down header material in the form of a third header end-cap at an opposite end of said heat exchanger coil simultaneously with the formation of said first header end-cap;
- 8. wherein said positioning a first heat exchange tube on said first header end cap step also positions said first heat exchange tube on said third header end-cap at an opposite end of said first heat exchange tube from said first header end cap;
- 9. using said second additive manufacturing depositor to lay down header material up to and over said first heat exchange tube to encapsulate an end thereof in an interior of said header and to form a second header spacing section between said first heat exchange tube and a second heat exchange tube at said opposite end of said first heat exchange tube;
- 10. wherein said positioning a second heat exchange tube on said first header spacing section step also positions said second heat exchange tube on said second header spacing section;
- 11. repeating steps 9 and 10 until a desired header size is reached;
- 12. using said second additive manufacturing depositor to lay down header material in the form of a fourth header end-cap at said opposite end of said heat exchanger coil from said second header end-cap.

* * * * *